United States Patent [19]
Dunn et al.

[11] Patent Number: 5,532,926
[45] Date of Patent: Jul. 2, 1996

[54] CONTROL SYSTEM FILTER HAVING BOTH EARLY-OFF HOLD AND MULTI-INTERVAL SAMPLING FUNCTIONS

[75] Inventors: Paul F. Dunn, Longmont; Randall C. Bauck, Boulder, both of Colo.

[73] Assignee: Maxtor Corporation, Longmont, Colo.

[21] Appl. No.: 371,923

[22] Filed: Jan. 11, 1995

Related U.S. Application Data

[63] Continuation of Ser. No. 69,423, Jun. 1, 1993, abandoned, which is a continuation-in-part of Ser. No. 722,663, Jun. 28, 1991, abandoned.

[51] Int. Cl.⁶ .................................................. G05B 21/02
[52] U.S. Cl. .................. 364/178; 364/179; 364/157; 341/123
[58] Field of Search ..................... 364/178, 179, 364/148, 157, 162; 341/122, 123, 124, 125

[56] References Cited

U.S. PATENT DOCUMENTS

| | | | |
|---|---|---|---|
| 3,591,779 | 7/1971 | Sutherland, Jr. | 364/179 |
| 4,322,697 | 3/1982 | Carbrey | 328/151 |
| 4,466,054 | 8/1984 | Shigemasa et al. | 364/162 |
| 4,488,242 | 12/1984 | Tabata et al. | 364/513 |
| 4,607,326 | 8/1986 | Mori et al. | 364/162 |
| 4,639,853 | 1/1987 | Rake et al. | 364/149 |
| 4,674,029 | 6/1987 | Maudal | 364/148 |
| 4,679,136 | 7/1987 | Shigemasa | 364/150 |
| 4,791,548 | 12/1988 | Yoshikawa et al. | 364/149 |
| 4,825,103 | 4/1989 | Hornak | 307/353 |
| 4,861,960 | 8/1989 | Haefner et al. | 219/110 |
| 4,862,016 | 8/1989 | Genrich | 328/151 |
| 5,202,821 | 4/1993 | Bauck et al. | 364/162 |

*Primary Examiner*—Paul P. Gordon
*Attorney, Agent, or Firm*—Sheridan Ross & McIntosh

[57] ABSTRACT

A control system employing a sample and early-off hold function implements the hold function in such a way as to effectively create a filter function. Instead of holding a constant value for the duration of a sample period, the control system turns the held sample value on and off multiple times during the sampling period. The notch filter is tunable by adjustment of the number, time and duration of the held sample intervals.

23 Claims, 9 Drawing Sheets

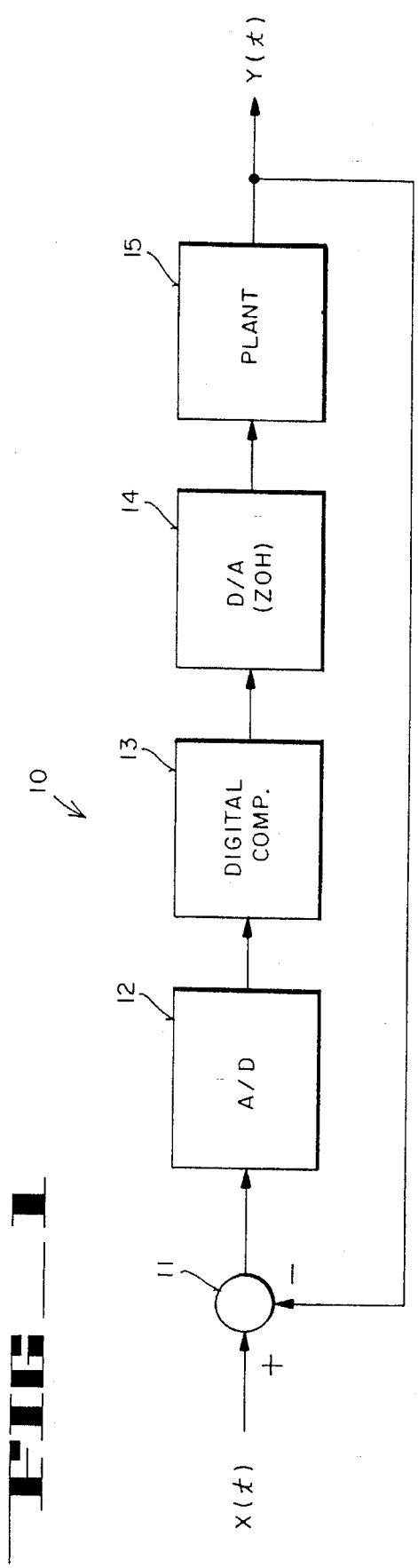
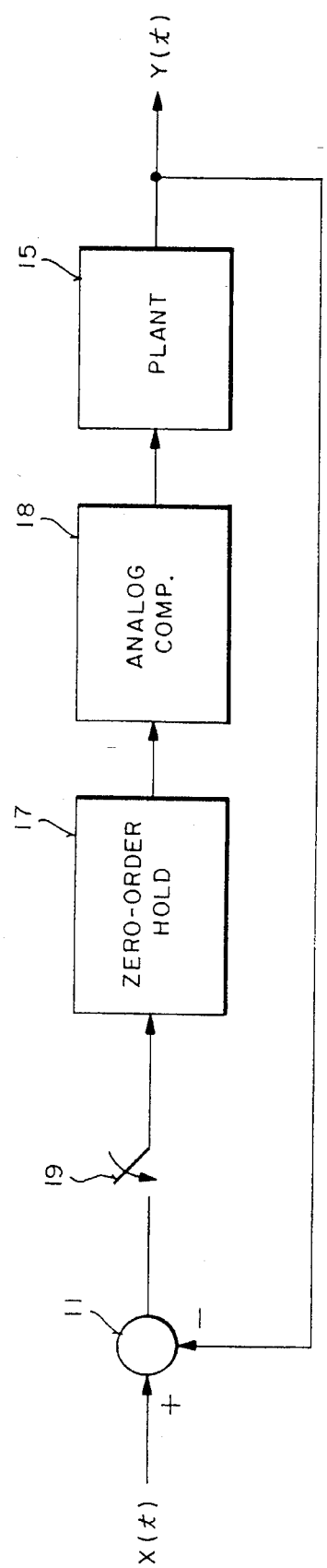
FIG_1
FIG_2

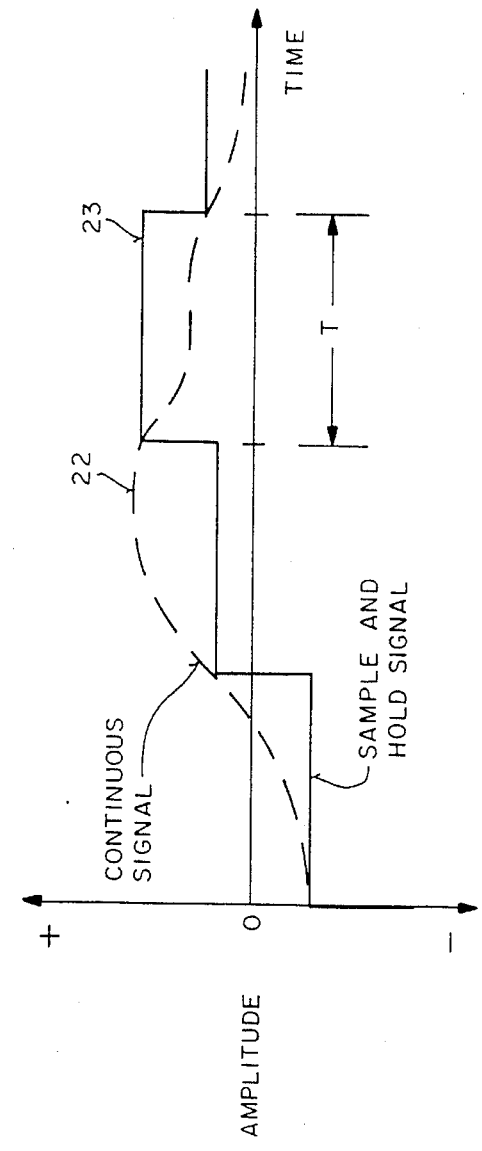
FIG._3 (PRIOR ART)
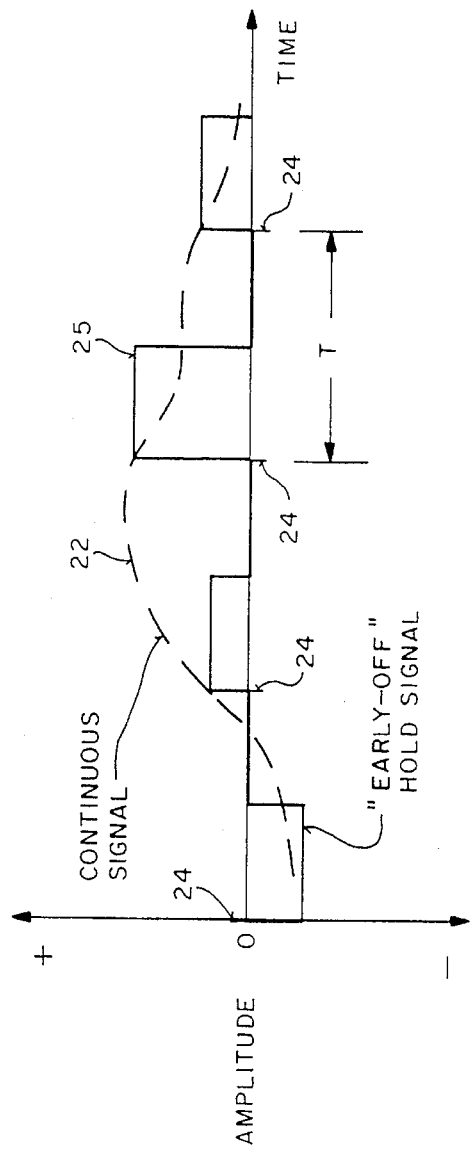
FIG._4

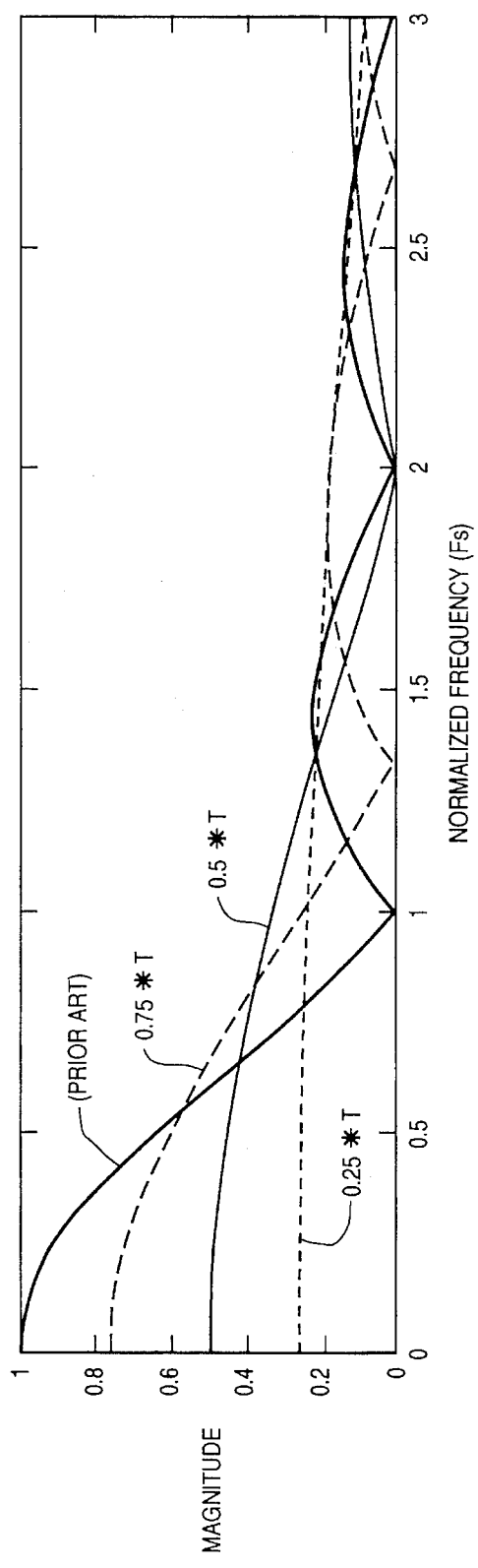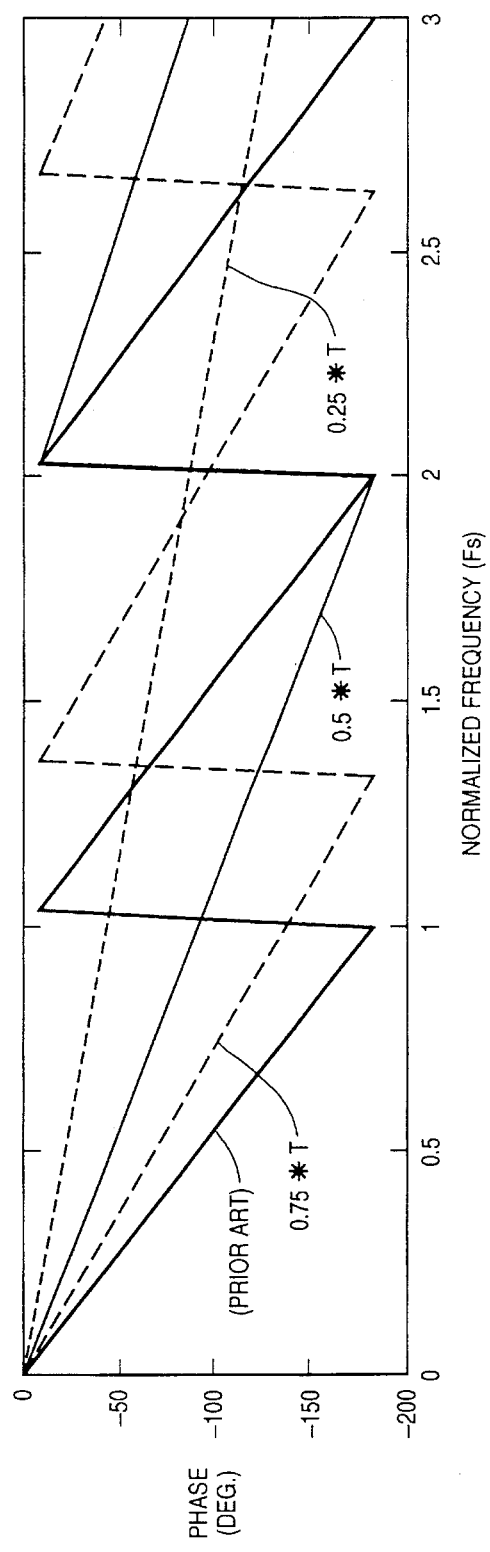

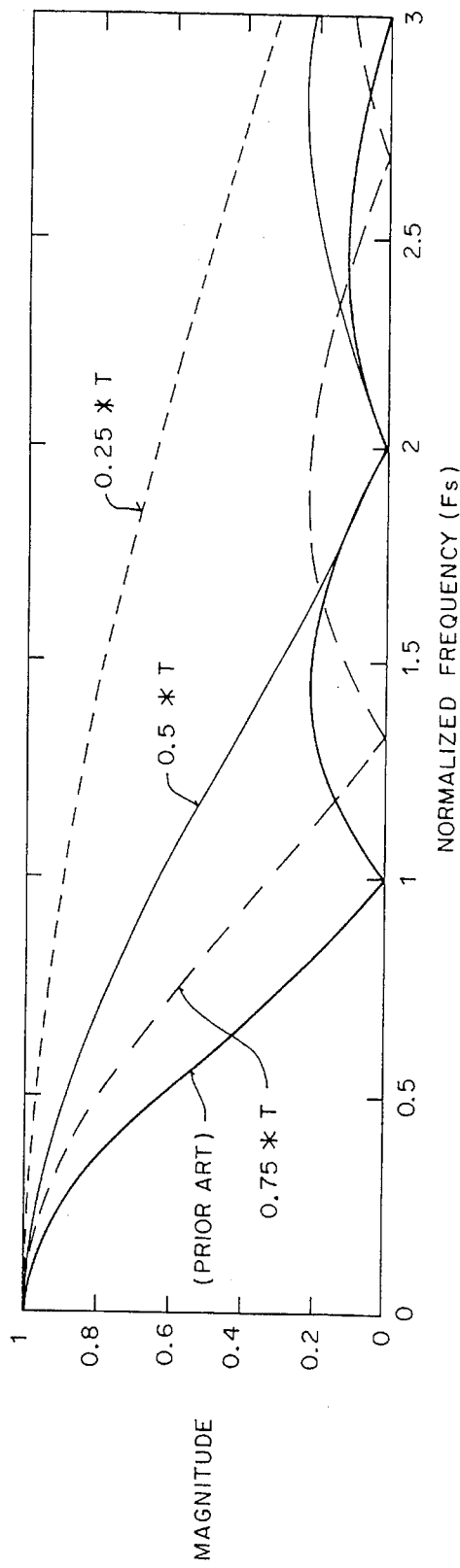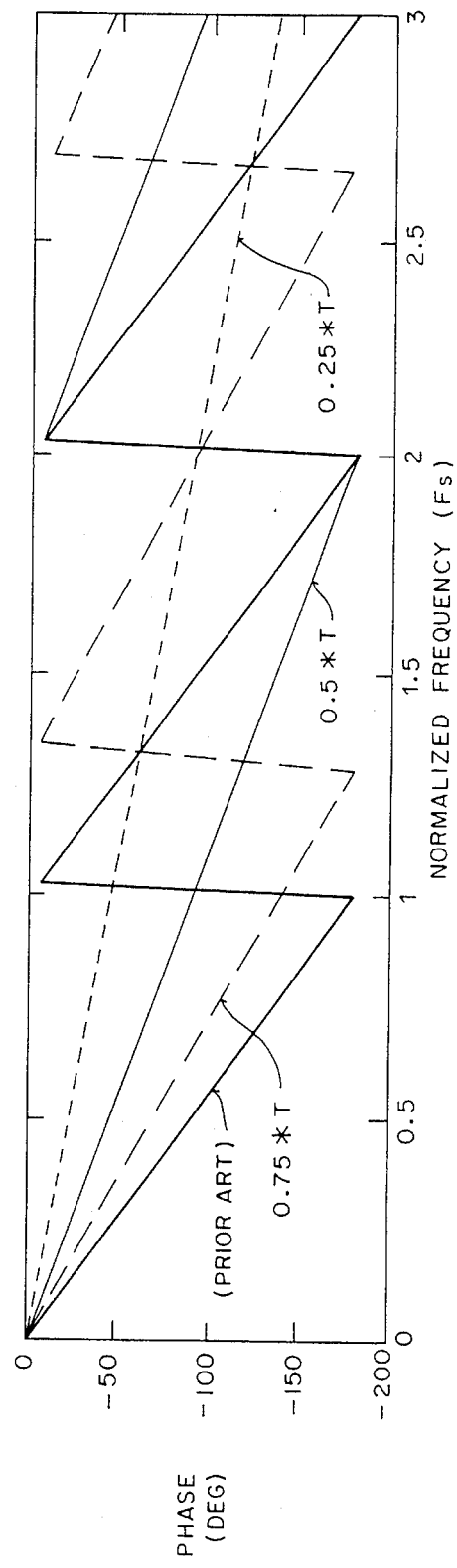

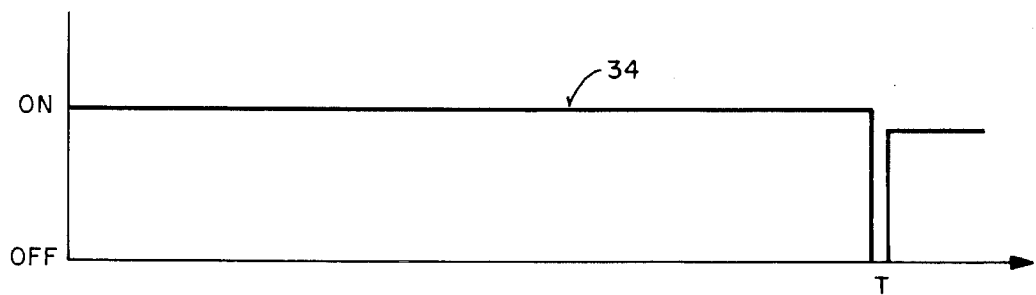
FIG _ 7A
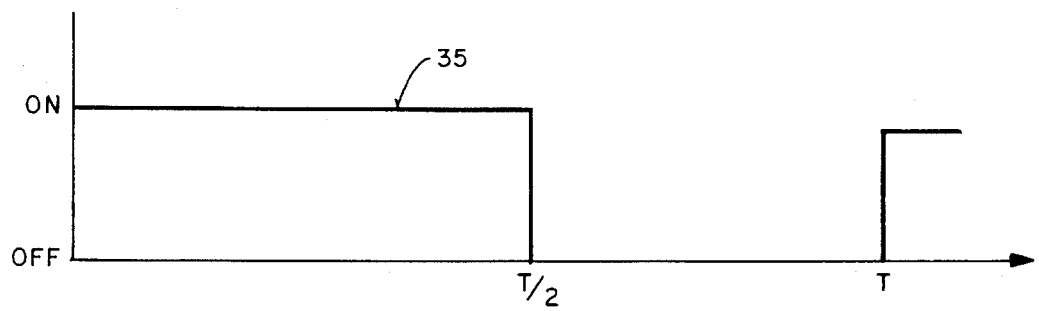
FIG _ 7B
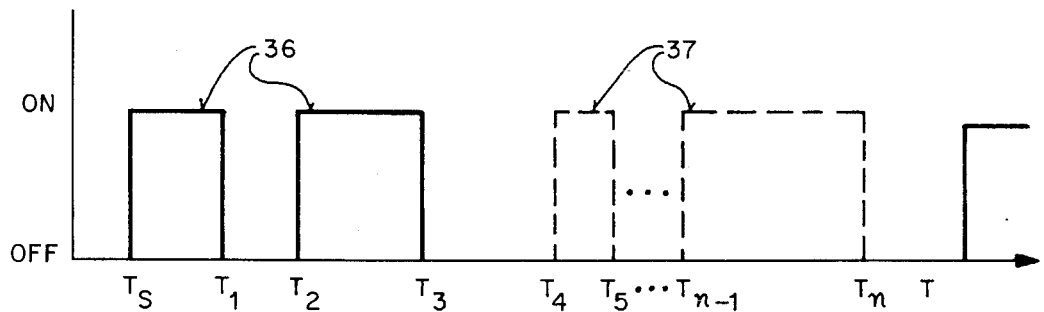
FIG _ 7C

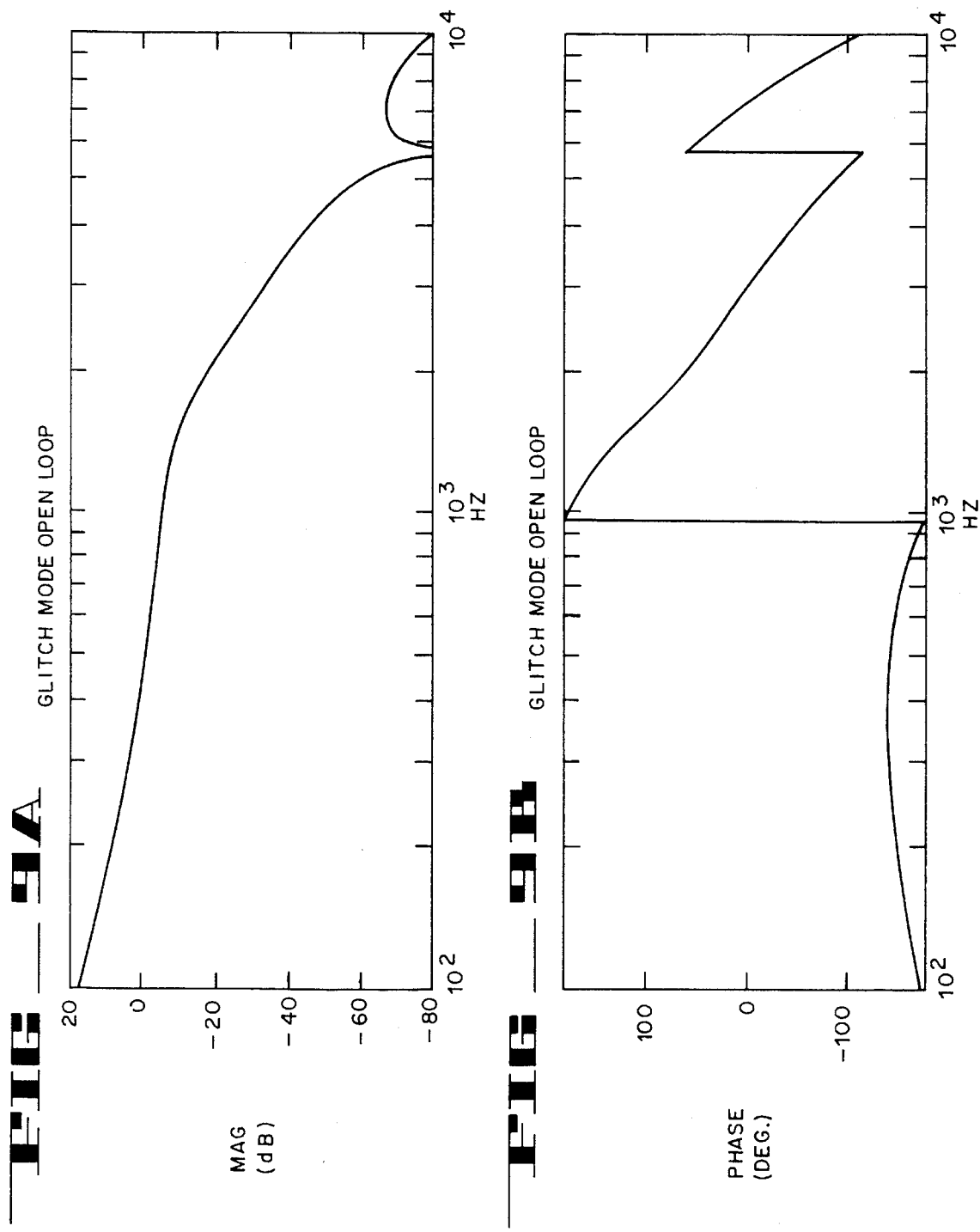
FIG. 9A GLITCH MODE OPEN LOOP
FIG. 9B GLITCH MODE OPEN LOOP

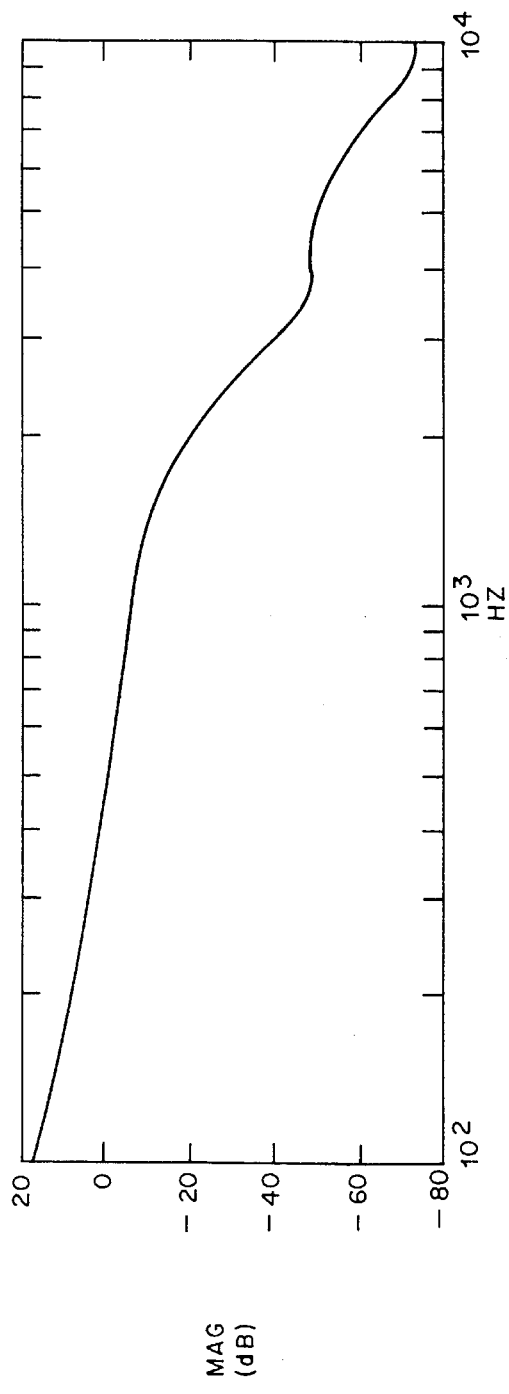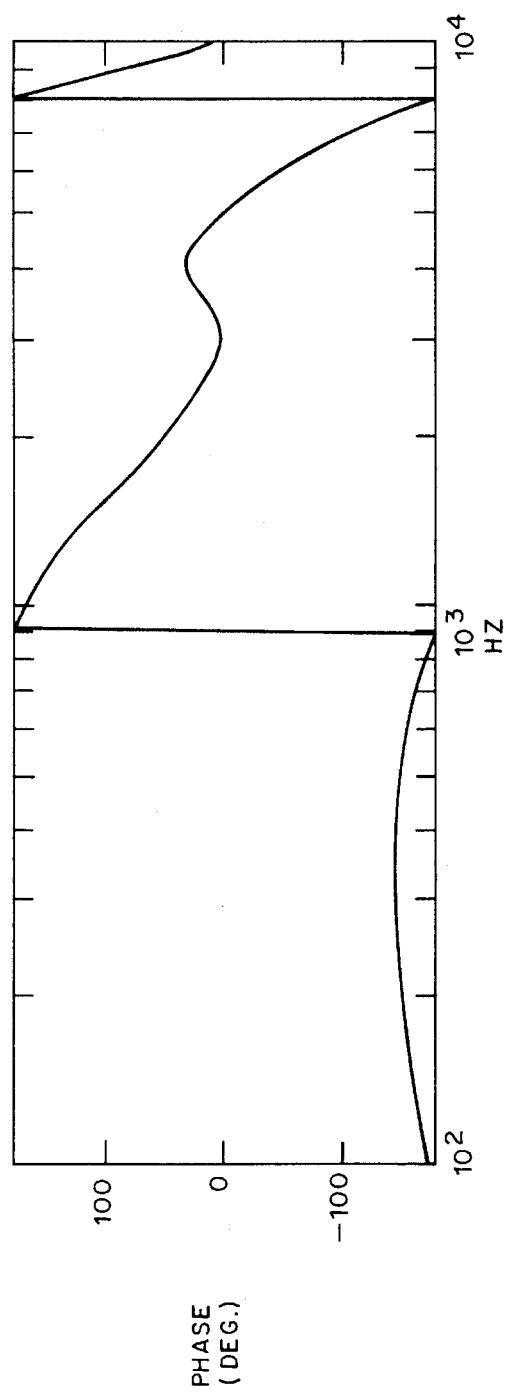

FIG _ 11
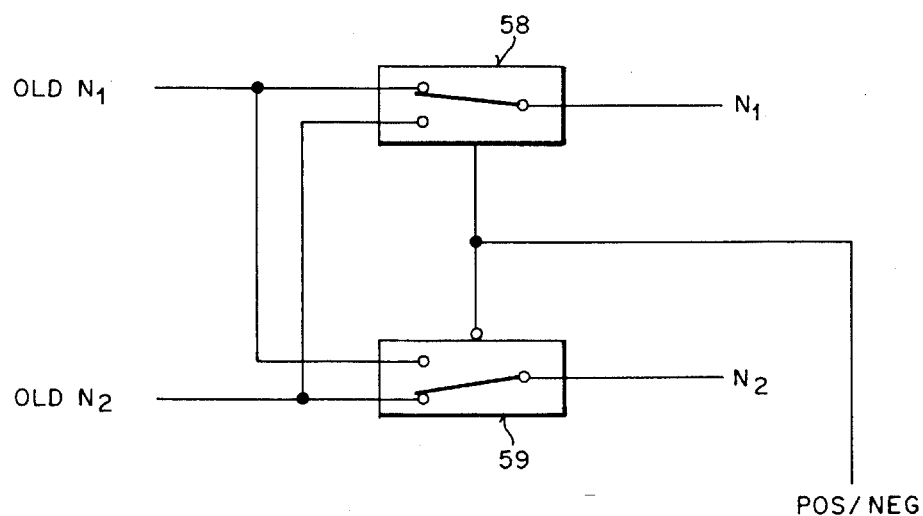
FIG _ 12
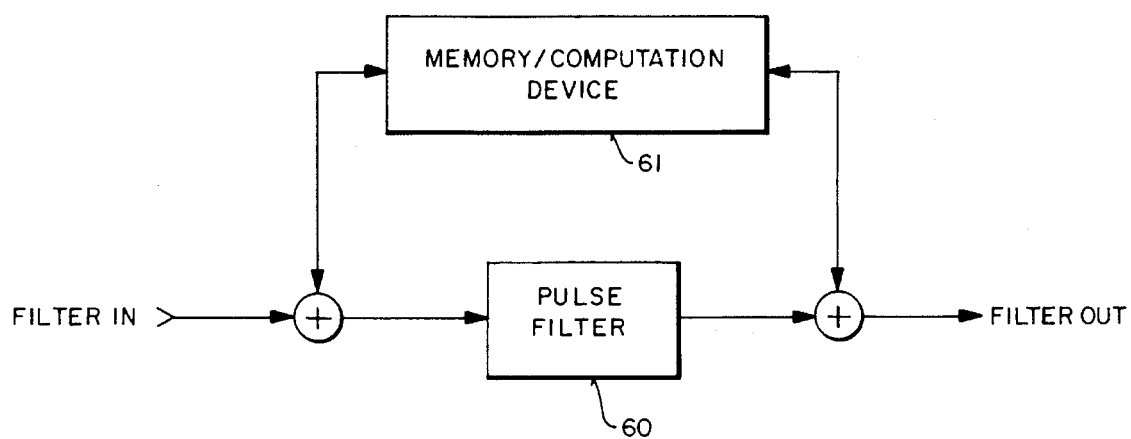

1

CONTROL SYSTEM FILTER HAVING BOTH EARLY-OFF HOLD AND MULTI-INTERVAL SAMPLING FUNCTIONS

RELATED APPLICATION

This is a continuation of application Ser. No. 08/069,423, filed on Jun. 1, 1993, now abandoned, which is a continuation-in-part application of Ser. No. 07/722,663; filed Jun. 28, 1991, which application is assigned to the assignee of the present invention.

FIELD OF THE INVENTION

This invention relates to the field of feedback control systems; particularly, sampled-data control systems.

BACKGROUND OF THE INVENTION

In recent years control systems have assumed an increasingly central role in the advancement of modern technological society. Virtually every aspect of our daily lives is influenced by some type of control system. Control systems are also ubiquitous throughout all sectors of industry. Fields such as space and military weapons technology, robotics, computer control, automatic assembly lines, transportation systems, automobile engine control, and many others, all employ a theory of automatic controls. As an example, a control system for controlling a robot arm is disclosed in U.S. Pat. No. 4,488,242. The list of fields which employ control systems is growing at an ever increasing rate.

In general, the objective of any closed-loop control system is to regulate the outputs of a "plant" in a prescribed manner by the inputs through the elements of the control system. The "plant" of a control system is defined within the context of this application as that part of the system to be controlled. The inputs to the plant are called the "actuating signals", and the outputs are known as the "controlled variables".

To obtain satisfactory response characteristics in a control system, an additional component—frequently referred to as a "compensator" or a "controller"—is connected within the feedback loop. While a variety of compensator designs exist, one widely adopted approach utilizes proportional, integral, and derivative compensator elements to develop an actuating signal. Examples of control systems employing compensators are disclosed in U.S. Pat. Nos. 4,679,136 and 4,861,960.

Control systems can be classified in two ways: Continuous-data systems and sampled-data systems. A continuous-data system is one in which the signals at various parts of the system are all continuous functions of time. Sampled-data control systems differ from continuous-data systems in that a signal (or signals) is measured or known only at specific, discrete instants of time.

In a typical analog sampled-data control system a sample and hold circuit is used to sample a system parameter at discrete points in time and then hold this fixed value for one sample period. Thus, the output of the sample and hold represents or approximates the continuous time varying value of the sampled system parameter. If a digital computer is used in the control of a sampled-data control system (as is commonly the case), then such systems are called digital sampled-data control systems. In a typical digital sampled-data control system, an analog-to-digital (A/D) converter is used to sample a continuous signal. The digital computer then calculates a control value which is then converted to an actuating signal by a digital-to-analog (D/A) converter. For such a system the D/A converter performs the hold function.

As will be seen, the present invention provides a filter in a control system employing an "early-off" hold function. In such a system, the correction signal to the actuator is developed from a sample-and-hold signal that is "turned-off," or set to a reference value, prior to the end of the sampling period.

SUMMARY OF THE INVENTION

A tunable notch filter created in a control system employing an "early-off" hold function is described. The invention involves implementing the hold function in such a way as to effectively create a notch filter about a particular frequency. Instead of holding a constant value for the duration of the sample period, the control system turns the held sample value on and off multiple times during the sampling period. The notch filter is tunable by adjustment of the number, time and duration of the held sample intervals.

In one embodiment, the sampled-data control system includes a means for calculating a difference signal between an output parameter and at least one input parameter, and a sample and hold means for periodically sampling the difference signal at discrete points in time. The sampled signal is held at the sampled value during a first set of time intervals and changed to a reference level during a second set of time intervals. The first and second time intervals are alternated within a sampling period T to create multiple on/off cycles. A compensation means generates an actuating signal as a function of the alternatively held/changed signal, with the actuating signal being delivered to said plant. By turning the sampled signal on and off multiple times during the sampling period, a tunable notch filter function is realized.

BRIEF DESCRIPTION OF THE DRAWINGS

The novel features believed characteristic of the invention are set forth in the appended claims. The invention itself however, as well as other features and advantages thereof, will be best understood by reference to the description which follows, read in conjunction with the accompanying drawings, wherein:

FIG. 1 is a block diagram of a digital sampled data control system.

FIG. 2 is a block diagram of an analog sampled data control system.

FIG. 3 illustrates a conventional sample and hold function acting on a continuous signal.

FIG. 4 illustrates the sample and early-off hold function of the present invention.

FIGS. 5A & 5B are a Bode plot comparing the magnitude and phase response of a conventional sample and hold function with the sample and early-off hold function of the present invention.

FIGS. 6A & 6B are a Bode plot comparing the magnitude and phase response of a conventional sample and hold function with the sample and early-off hold function of the present invention with gain compensation.

FIGS. 7A, 7B & 7C are timing diagrams illustrating the revised early-off hold function of the present invention.

FIGS. 9A & 9B are a Bode plot showing the magnitude and phase response of a standard early-off hold function.

FIGS. 10A & 10B are a Bode plot showing the magnitude and phase response of the revised early-off hold function of the present invention.

FIG. 11 illustrates a switching network for use in conjunction with the present invention.

FIG. 12 illustrates a scheme for generating a generalized pulse filter in accordance with the present invention.

DESCRIPTION OF THE PREFERRED EMBODIMENT(S)

Figure 8A:
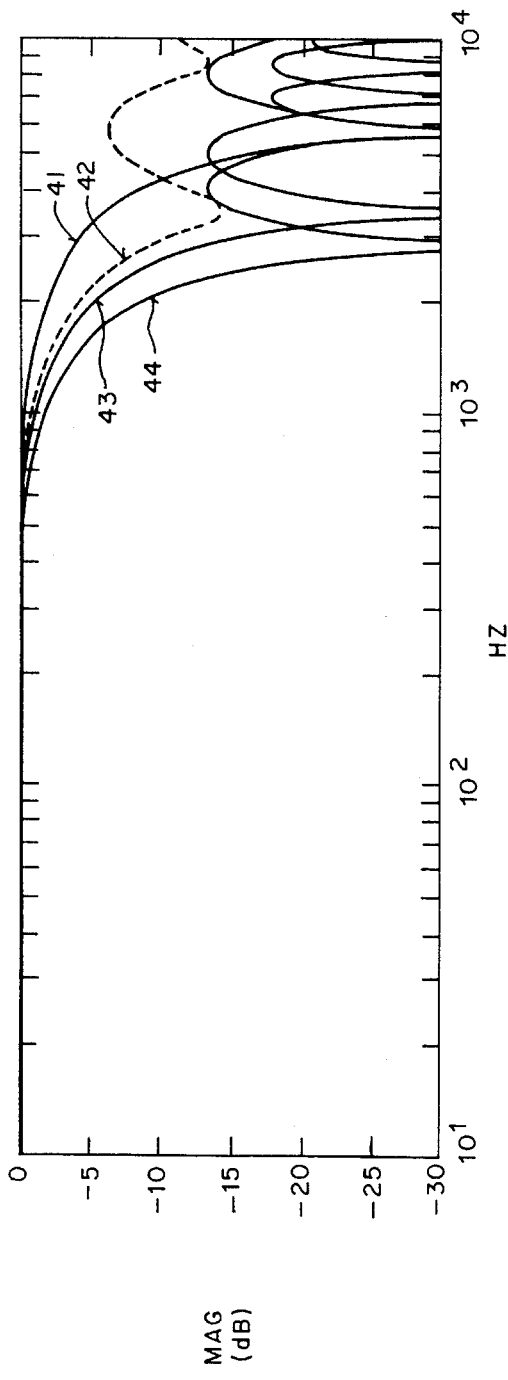
FIGS. 8A & 8B are a Bode plot comparing the magnitude and phase response of a conventional sample and hold function, a standard early-off hold function, and the revised early-off hold function of the present invention.
Figure 8B:
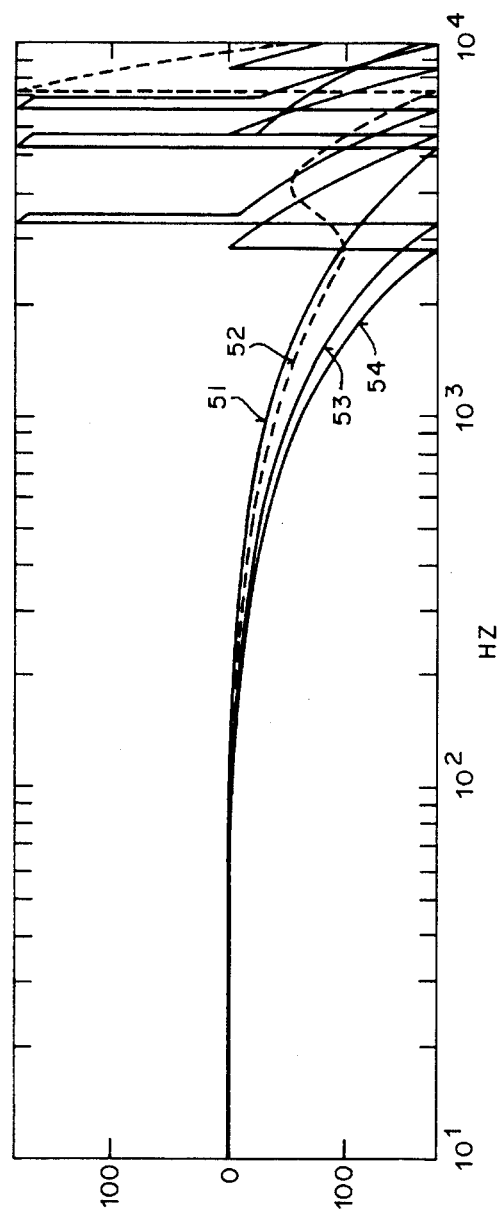

A control system with a revised early-off hold function for notch filter compensation is described. In the following description, numerous specific details are set forth such as time periods, equations, experimental data, etc., in order to provide a thorough understanding of the invention. It will be obvious, however, to one skilled in the art that these specific details need not be used to practice the present invention. In other instances, well-known structures and methods have not been set forth in detail in order to avoid unnecessarily obscuring the present invention.

In the course of describing the present invention, reference may sometimes be made to use of the invention in conjunction with specific applications, such as a disk controller for use in a magnetic recording system. It is appreciated that such implementations merely reflect a particular embodiment and should not be taken as a limitation on the scope of the present invention. Hence, it should be understood that the concepts presented in this disclosure may be employed in a wide range of control system or signal processing applications. In other words, the novel aspects described in this specification are fundamental in nature—finding wide application within the general field of signal processing, and particularly in the area of sampled-data control systems.

Now with reference to FIG. 1, there is shown a block diagram of a typical digital sampled-data control system 10, wherein plant 15 represents the physical system or process to be controlled. In one embodiment, for example, plant 15 may comprise a magnetic recording system in which the position of the transducer over the magnetic recording media is controlled by a servo mechanism which receives signals from the read/write electronics of the system.

In FIG. 1, the output signal or controlled variable, Y(t), is shown being compared to a reference input, X(t). In accordance to the disk drive example provided above, this reference input is the physical position of a particular track to be read. The controlled variable would then be the physical position of the head.

The comparison between the reference input and the controlled signals occurs at sensing device 11. Device 11 acts as a function point for signal comparisons. Physically, sensing device 11 comprises an ordinary differential amplifier, multiplier, some other signal-processing transducer or similar circuitry. In the case of FIG. 1, the output of device 11 is an error signal, E(t) which corresponds to the difference between the input reference, X(t), and the output, Y(t). This error signal is delivered to analog-to-digital (A/D) converter 12.

A/D converter 12 periodically samples the analog error signal generated by sensing device 11. It then converts the analog input signal to a digital output signal. (The circuitry which comprises the A/D converter is well known and understood in the art.) This digital output is then provided as an input to the digital compensator 13.

Compensator 13 is a dynamic system which has been purposefully added to the loop to enhance the closed-loop system characteristics. In a digital system such as that shown in FIG. 1, compensator 13 is usually implemented algorithmically with a microprocessor or digital computer. The output of digital compensator 13 is an actuating signal, A(t), which is made a function of the error signal, E(t). The actuating signal is developed for correction of plant 15. In this sense, the compensator block may be considered as the block which contains the control strategy for the entire control system.

Before being delivered to plant 15, the actuating signal must first be converted back from a digital, to an analog signal. This conversion is carried out by an ordinary digital-to-analog (D/A) converter 14. The function of D/A converter 14 can also be thought of as a zero-order hold (ZOH), since the output of D/A converter 14 is held constant between successive updates of the digital control algorithm. Thus, for the digital sampled control system shown in FIG. 1, the sample function can be thought of as occurring in A/D converter 12, while the hold function is a result of the output of the D/A converter (or ZOH) 14. It is appreciated that in the case of a digital sampled control system, the compensator function can be implemented digitally, with the aid of a digital computer. Any number of well known techniques may be used to develop the control strategy.

FIG. 2 illustrates a typical analog control system wherein the zero-order hold unit 17 is implemented as part of a sample and hold function which samples an input system parameter at discrete points in time and then holds each of these sampled values constant for one sample period. In the analog control system of FIG. 2, the sampling operation is modeled by an ideal impulse sampler having a sampling period T. The sampling device in this illustration is simply represented by switch 19.

It is appreciated that when an analog signal is applied to an ideal impulse sampler, the output of the sampler is a train of impulses—each occurring at an integral multiple of the sampling period. The impulses are received by zero-order hold block 17, which delivers a constant value (equal in magnitude to the value of the continuous signal at the sampling instant) for one sample period to compensator 18. Compensator 18 functions in the same manner as digital compensator 13; that is, compensator 18 generates an actuating signal for correction of plant 15.

Referring now to FIG. 3, a conventional sample and hold function acting on a continuous analog signal 22 is shown. Note that held signal 23 is constant for one sampling period T, with a magnitude determined by sampling the continuous signal at discrete points in time. The result of the sample and hold function is a sort of staircase waveform which, for the analog control system of FIG. 2, is input to compensator 18.

The early-off hold function of a digital or analog sampled-data control system is implemented in such a way as to reduce the amount of delay or phase lag introduced into the system. Rather than holding a constant value for the duration of the sample period, the system simply holds the instantaneous output value as a constant for some fraction of the sampling period. During the remaining portion of the sampling period, the output is simply shut off. In other words, the output of the hold device is forced to a reference level (e.g., zero or some other appropriate value) for the remainder of the sampling period. For example, the held value can be taken to an integrator level for the remainder of the sampling period. The integrator level represents an integration of past error signals. Of course, other levels or values are possible. This concept is referred to as an early-off hold function.

FIG. 4 illustrates the early-off hold function applied to the continuous analog signal 22. The sample is held for one-half of the sampling period T, wherein sampling occurs at discrete time points 24. The early-off hold output is denoted by waveform 25 in FIG. 4. Note that at sampling time points 24, waveform 25 assumes the current or instantaneous value of signal 22. This constant value is then held for one-half of the sampling period,—after which time the value of waveform 25 is changed. For the example of FIG. 4 waveform 25 may be simply returned to zero, or some other appropriate value. When the next sampling time point 24 arrives, waveform 25 once again assumes the instantaneous value of signal 22 and holds this as a constant for one-half of the sampling period. It should be understood that the fractional portion of the sampling period for which the constant value is held (in this case, for example, the "on-time" is one-half of the sampling period T) is variable, as discussed in more detail below.

The advantage of the invented early-off hold function over a conventional hold is best appreciated with reference to FIGS. 5A and 5B. FIGS. 5A and 5B are a Bode plot which illustrates the phase loss caused by the hold function of a conventional sample and hold as against the reduced phase lag associated with a control system employing an early-off hold. As can be seen, the amount of phase lag due to the hold function of the prior art is 18° at one-tenth of the sample rate. At one-fifth of the sample rate, the phase lag is increased to 36°. Delay or phase lag in the control system resulting from the hold function of conventional sample and hold circuit ultimately forces the system designer to compromise system stability or otherwise limit system bandwidth.

It should be evident from FIG. 5A and 5B, that employing the early-off hold function significantly reduces the amount of delay and the associated phase loss. FIGS. 5A and 5B show the results wherein the early-off function is employed for three different fractional portions of the sampling period T. The fractional time period over which the constant value of the continuous signal is held is defined as $T_{on}$, e.g., $T_{on}=0.75*T$, $0.5*T$, etc. In the Bode plots of FIGS. 5A and 5B, $T_{on}$ is shown being equal to 0.75, 0.5 and 0.25 times the sampling period T. Note that smaller values of $T_{on}$ produce increasingly better phase results.

Mathematically, the effect of the sample and hold function on either a digital or analog sampled-data control system is given by the following two equations, which represents the transfer function of the sample and hold.

$$S \& H(s)=(1-e^{-sT})/sT \qquad (1)$$

$$S \& EOH(s)=(1-e^{-sT_{on}})/sT \qquad (2)$$

Equation 1 is the transfer function (in the s-domain) for a sampled-data control system employing a conventional sample and hold function. Equation 2 is the transfer function of a similar system employing the early-off hold concept. In equation 2, $T_{on}$ represents the time that the sampled value is held constant.

Note that one of the consequences of the sample and early-off hold function is that the magnitude (i.e., gain) of the transfer function is proportional to $T_{on}/T$. Thus, when the sample and early-off hold is implemented in a control loop, the resulting gain reduction is compensated for by increasing the gain of some other element of the loop which increases the overall loop gain, thereby raising the magnitude response of the control system without affecting the phase.

FIGS. 6A and 6B represent a Bode plot which illustrates the overall effect of implementing the sample and early-off hold with an accompanying gain adjustment.

Three different values of $T_{on}$ are shown in FIGS. 6A and 6B. Observe that in accordance with the present invention, there is less phase loss caused by the early-off hold function when compared to conventional control systems. It is appreciated that the amount of phase loss (as a function of $T_{on}$) can be adjusted by the system designer during the design process.

In a system employing an early-off compensator, an actuating signal to a plant 15, such as the one noted hereinabove with respect to the D/A converter 14, is developed from a sample and held signal that is "turned off", or set to some system reference level during some fraction of the sampling period. Practitioners of ordinary skill in the control system art will appreciate that the early-off method, like a traditional sample and hold device, has a sampling null. In an ordinary sample and hold device, the sampling null occurs at the sampling frequency, fs. In an early-off system of the type described above, the sampling null occurs at a frequency proportional to $f_s$ (T/Ton). If Ton is equal to T/2, then the sampling null occurs at a frequency of $2(f_s)$.

In the modified early-off control system of the present invention, the sampling null position is carefully selected to effectively create a notch filter about some resonant frequency. For example, where the early-off hold method of the present invention is employed in a disk drive system, the notch filter can be created about a mechanical resonance of the disk drive itself. This means that the amplitude of the sampled signal can be reduced in accordance with the present invention at the frequency where the mechanical resonance exists. The suppression of mechanical resonances in such a system improves overall performance dramatically.

In accordance with the present invention, the standard early-off signal is revised by turning the held signal on and off multiple times to create a tunable notch filter. With reference to FIGS. 7A and 7B, FIG. 7A illustrates a standard sample and hold waveform 34 which is sampled at the beginning of the sampling period and then held at a constant value for the duration of the period T. (Note that the sample and pulse waveform is shown with a small "off" time to signify change in the sample at the beginning of the next period.) Waveform 35 in FIG. 7B illustrates the early-off hold function previously described, wherein the sampled value is held for some fractional portion of the sampling period. In the example of FIG. 7B, waveform 35 is shown being held for a time period equal to T/2, or one-half of the sampling period T. As can be seen, during the remainder of the sampling period, the held value is turned off (e.g., taken to zero or some other appropriate reference value.) At the beginning of the next sampling period, waveform 35 once again assumes the instantaneous value of a sampled signal.

FIG. 7C illustrates the revised early-off hold function having multiple on/off cycles to implement a tunable notch filter function. In the revised early/off hold function, the sampled value is alternatively turned on and off during the sampling period T. By way of example, FIG. 7C illustrates the held value being on during the time intervals from $T_s$ to $T_1$ and from time $T_2$ to $T_3$. This is shown in FIG. 7C by pulse waveforms 36. $T_s$ represents the starting time of the first "on" interval within the sampling period. Depending on the frequency and characteristics desired in the notch filter function, the number, timing, and duration of the multiple on/off cycles of the early/off hold function can be altered. In other words, changing the number and characteristics of the on/off waveforms allows the user to select the sampling null position width and depth to effectively create the notch filter function about a particular frequency. For example, the selection of a sampling null position can be used to suppress a mechanical resonance in the servo mechanism of a magnetic disk drive recording system. The concept of adding additional pulses (or changing their duration or timing,) is illustrated in FIG. 7C by dashed waveforms 37, which show the held value being "on" from time intervals from $T_4$ to $T_5$ and from $T_{n-1}$ to $T_n$, where n is an odd integer. The transfer function of the revised early-off hold is represented mathematically by the equation $$G(s)=[\exp^{(-sT_s)}-\exp^{(-sT1)}+(\exp^{(-sT2)}-\exp^{(-sT3)}\ldots+\exp^{(-sTn-1)}-\exp^{(-sTn)})]/(sT)$$

where n is an odd integer (greater than 3). Note that in the above equation, that $T_s$ does not have to be zero, or even some small value corresponding to the shortest possible hardware delay. The starting time, $T_s$, as with any of the time points $T_n$ can be selected to occur at any discrete point in time depending on the desired frequency characteristics of the response. This means that the "on" waveform blocks shown in FIG. 7C do not have to be equally spaced or of equal duration.

To better understand and appreciate the present invention, consider the following example in conjunction with FIGS. 8A through 10B. In this example, assume that the sample rate frequency $f_s$=2.8 KHz. FIGS. 8A and 8B show four Bode plots illustrating the magnitude and phase response for four differently configured control systems. Waveforms 41 and 51 represent the response of a standard early-off hold function with $T_{on}$=T/2. Waveforms 42 and 52 illustrate the revised early-off hold function of the present invention having two "on" waveform blocks with $T_s$=0, T1=T/3, $T_2$=T/2, and $T_3$=$T_2$+T/2–T1. Waveforms 43 and 53 illustrate a standard early-off with Ton=3T/3.7. Finally, waveforms 44 and 54 show the response of a conventional sample and hold device.

Assume that a mechanical resonance exists at 3.5 KHz. and that it is desired to reduce the amplitude of the response by approximately 8 Db relative to the standard early-off responses. Two available options are to either lengthen the "on" time of the standard early-off system, or utilize the revised early-off system of the present invention. Note that in the case of the lengthening of the standard early-off time, that additional phase loss is incurred within the system. In contrast, the revised early-off hold function clearly meets the gain reduction requirement of the example, but without the phase loss associated with lengthening the early-off time as seen in waveforms 43 and 53.

By way of further example, FIGS. 9A and 9B illustrate a Bode plot for a control system using a standard early-off hold function. In contrast, FIGS. 10A and 10B show a bode plot of a system employing the revised early-off hold function of the present invention. For the given bandwidth of 450 Hz, the revised early-off hold function only causes about three degrees of lost phase margin, and no change in gain margin, relative to the standard early off.

It is appreciated that the described method of revised early off compensation is not only valuable for providing a notch filter function, but the actual notch filter itself could be implemented in a way that would make it self-tuning. This means that, if a resonance were not well behaved or known within a particular system, the system could automatically adjust the notch filtering characteristics during operation to provide an optimum performance result. In the case of a magnetic recording system, for instance, a microprocessor device implementing the digital algorithm of the control system could be used to optimize the characteristics of the notch filter so as to suppress mechanical resonances in the disk drive system.

While the foregoing description teaches applying the early-off hold function to a signal representative of the difference between an output parameter and a reference input parameter, it should be understood that the present invention may be utilized effectively anywhere within the signal processing loop. For instance, some signal processing systems are configured to sample an output signal rather than an error signal. These systems may then incorporate the compensator into the feedback loop. Still other systems, such as a digital signal processing system, sample the output, calculate a result from the output, and then apply a hold function to that result. The point to be made is that the revised early-off hold function of the present invention could be employed within a variety of different signal processing systems to reduce phase loss.

Observe that in the transfer function for the revised early-off hold function implementing notch filter compensation that the signs are determined and fixed. At times, it may be desirable to have the flexibility to change the polarity of the individual terms in the transfer function to create a more generalized filter. In other words, numerous other filter functions could be implemented if the polarity (i.e., either positive or negative) of the terms in the transfer function could be switched or changed.

A much wider range of pulse filter transfer functions can be realized by changing the hardware in the control system employing a early-off hold function as shown in FIG. 11. FIG. 11 illustrates one type of circuit which may be utilized in conjunction with the present invention in a way which would make the individual terms of the transfer function not limited to a particular sign. FIG. 11 illustrates the addition of an inverting circuit comprising switching elements 58 and 59 controlled by a POS/NEG switching line. This inverting circuit can be included in the control system previously described to operate on the correction signal in order to change the sign of the terms that make up the transfer function. In the illustration of FIG. 11, the inputs OLD $N_1$ and OLD $N_2$ represent a differential signal applied to an amplifier that may be included, for example, in the compensator circuitry. Depending upon the state selected for switching elements 58 and 59, the outputs $N_1$ and $N_2$ may either be the same as the OLD $N_1$ and $N_2$ values, respectively, or reversed. Driving the POS/NEG control line at a rapid rate may be accomplished via a set of control registers implemented in a gate array.

Considering again the example of a disk drive system, during drive initialization the control registers may be loaded with predetermined values for a given time duration to control the POS/NEG control line. In such a scheme, the limiting factor—and the ability to generate a general purpose transfer function for a pulse filter—would only be limited by the number of control registers utilized. Note that with this method, the control register values define the transfer function. Some of the flexibility of a digital Loop is therefore created without the corresponding need for a high-powered signal processor.

The next step in further generalizing the pulse filter function is to make the $N_1$ and $N_2$ differential amplifier signals have a variable gain capability. In a system having this added flexibility, the desired gain at a given step is generated by another setting in a control register, in addition to the POS/NEG signal lines. In this respect, for example, a variable gain amplifier (VGA) can be implemented as a stage either in front of or behind the early-off differential amplifier. The VGA stage can be implemented using ordinary CMOS digital-to-analog converters (DACs) as variable resistors in the current differential stage. Other alternatives include employing a multiple gain power amplifier. In either case, the result is the same: more flexibility in the design of the transfer function generating the filter compensation.

By way of example, a compensator may be created without the need for proportional and derivative generating resistor capacitor pairs using this type of generalized pulse filter function. Including the gain terms, the more generalized transfer function of the pulse filter is given as $$G(s)=[A_1(\exp^{(-sTs)}-\exp^{(-sT1)})+(A_3(\exp^{(-sT2)}-\exp^{(-sT3)}) \ldots +A_n(\exp^{(-sTn-1)}-\exp^{(-sTn)}))]/(sT)$$

where n is an odd integer (greater than 3). It is appreciated that for the above transfer function equation, that the gain terms of the pulse filter define the impulse response of the filtering function. Since the sample rate defines the maximum time available for the impulse response, there is a limitation on the transfer functions that can be generated. This limitation, however, is removed with the addition of one or more memory and/or computation devices (either analog or digital) as illustrated in FIG. 12.

FIG. 12 shows one or more memory/computation devices 61 coupled and parallel with the pulse filter circuitry 60. The system configuration shown in FIG. 12 thus provides for a more flexible filter design in ways which allow for the extension of impulse responses beyond one sample period. Since there are limitless ways to connect the memory/computation devices, its not possible to define a general transfer function for the system configured as shown in FIG. 12. Practitioners in the art, however, will appreciate that the configuration of FIG. 12—including the addition of the memory and/or computation devices—allows for the creation of traditional finite impulse response (FIR) and infinite impulse response (IIR) filters, as well as other previously unattainable filter transfer functions.

Consider, for example, a situation in which it is desired to implement an IIR filter function wherein the response of the filter extends for 2 seconds, and assuming a sampled data rate of 1 second. Without the addition of memory/computation devices, 61, a situation would be created in which the output was intended to be held for a full 2 seconds, yet a new sample would arrive every 1 second. However, by including memory/computation devices 61 around pulse filter 60 the response from the first sample period can be summed together with the beginning of the response from the next sample period, an so on. Essentially what devices 61 permits is the inclusion of multiple pulse filters in parallel, wherein the responses from the pulse filters are summed together to provide a filter output. Such a implementation, as shown in FIG. 12, therefore allows for the creation of IIR and FIR filter functions, as well as other more generalized filter functions.

Note that the memory/computation devices 61 may comprise a variety of elements. For example, device 61 may comprise an ordinary microprocessor. A microprocessor device implementing the memory/computation function of block 61 could be used in a situation where an integrator function was implemented. In such a situation, the pulse filter could be defined as a ramping impulse response. At the end of the sample period, the memory/computation device would store the current pulse filter output and add it to the input of the next sample. Thus, the addition of the memory and/or computation devices therefore allows for the creation of filter functions previously unattainable.

Whereas many alternations and modifications of the present invention will no doubt become apparent to a person of ordinary skill in the art after having read the foregoing description, it is to be understood that the particular embodiments shown and described by way of illustration are in no way intended to be considered limiting. For example, while the preferred embodiment has been described in conjunction with a specific type of control system, it should be understood that the present invention may be used with other types of sampled-data control systems, or with other signal processing systems implementing a hold function. Furthermore, the present invention is not limited to either analog or digital implementations. Therefore, reference to the details of the preferred embodiment are not intended to limit the scope of the claims which themselves recite only those features regarded as essential to the invention.

Thus, a generalized pulse filter type of control system has been described.

We claim:

1. A sampled-data control system controlling at least one output parameter of a plant, comprising:

means for calculating a difference signal between said output parameter and at least one input parameter;

sample and hold means for periodically sampling said difference signal at discrete points in time, said sampled signal being held at a sampled value during a first set of time intervals and changed to a reference level during a second set of time intervals, said first and second time intervals being alternated within a sampling period T; and compensation means generating an actuating signal as a function of said alternatively held/changed signal, said actuating signal being delivered to said plant for correction of said at least one output parameter, said compensation means providing a filtering function.

2. The control system of claim 1 wherein a transfer function of said sample and hold means is given in the s-domain by the equation:

$$G(s)=[\exp^{(-sTs)}-\exp^{(-sT1)}+(\exp^{(-sT2)}-\exp^{(-sT3)} \ldots +\exp^{(-sTn-1)}-\exp^{(-sTn)})]/(sT)$$

where n is an odd integer greater than 3, Ts is a start time, time intervals Ts to T1, T2 to T3 . . . Tn−1 to Tn comprise said first set of intervals, and time intervals T1 to T2, T3 to T4 . . . Tn to T, comprise said second set of intervals.

3. The control system of claim 1 wherein said difference signal comprises an error signal.

4. The control system of claim 3 wherein said compensation means comprises a digital computer which implements a digital control algorithm.

5. The control system of claim 4 wherein said sample and hold means comprises an analog-to-digital (A/D) converter coupled to said compensator means for periodically sampling said difference signal and a digital-to-analog (D/A) converter for holding the output of said compensation means constant between successive updates of said digital control algorithm.

6. The control system of claim 1 wherein said plant comprises a magnetic recording system.

7. The control system of claim 6 further comprising a means for adjusting said first and second sets of time intervals to optimize said filtering function at a mechanical resonance frequency of said magnetic recording system.

8. The control system of claim 1 further comprising a control means for selectively switching the polarity of said alternately held/changed signal.

9. The control system of claim 8 further comprising a variable gain means for amplifying said alternately held/changed signal.

10. The control system of claim 9 wherein a transfer function of said sample and hold means is given in the s-domain by the equation:

$$G(s)=[A_1(\exp^{(-sTs)}-\exp^{(-sT1)})+(A_3(\exp^{(-sT2)}-\exp^{(-sT3)})\ldots +A_n(\exp^{(-sTn-1)}-\exp^{(-sTn)}))]/(sT)$$

where n is an odd integer greater than 3, $A_n$ is a gain term, and Ts is a start time, and where time intervals Ts to T1, T2 to T3 . . . Tn–1 to Tn comprise said first set of intervals, and time intervals T1 to T2, T3 to T4 . . . Tn to T, comprise said second set of intervals.

11. In a sampled-data control loop for regulating an output parameter of a plant, a method of compensation providing a filter comprising the steps of:

periodically sampling a signal at discrete points in time, said signal being developed within said loop;

holding a sampled value of said periodically sampled signal on during a first set of time intervals and turning off said sampled value during a second set of time intervals, said first and second time intervals being alternated so as to form a revised sample-and-hold signal having multiple on/off cycles within a sampling period T;

generating an actuating signal which is a function of said revised sample-and-hold signal, said actuating signal being coupled to said plant for correction of said output parameter.

12. The method of claim 11 wherein said periodically sampled signal comprises an error signal representing a difference between said output parameter and a reference input parameter.

13. The method of claim 11 wherein said plant comprises a magnetic recording system.

14. The method of claim 13 further comprising the step of adjusting said first and second sets of time intervals to optimize said filter at a mechanical resonance frequency of said magnetic recording system.

15. The method of claim 11 further comprising the step of selectively changing the polarity of said sampled value during said first set of time intervals.

16. The method of claim 15 further comprising the step of selectively adjusting a gain of said sampled value during said first set of time intervals.

17. In a sampled-data control loop for regulating an output parameter of a plant, said plant comprising a magnetic recording system in which the position of a transducer is controlled by a servo mechanism, a method of compensation providing a notch filter comprising the steps of:

calculating an error signal representing a difference between said output parameter and an input parameter;

periodically sampling said error signal to provide a sampled error signal value at discrete points in time;

alternately holding on and turning off said sampled error signal value multiple times during a sampling period, T;

generating an actuating signal which is a function of said alternatively held on and turned off error signal, said actuating signal being coupled to said plant for correction of said output parameter.

18. The method of claim 17 wherein said sampled error signal value is held on during a first set of time intervals and turned off during a second set of time intervals within said sampling period, and further comprising the step of:

adjusting said first and second sets of time intervals to optimize said notch filter at a mechanical resonance frequency of said magnetic recording system.

19. The method of claim 18 wherein said first set of time intervals comprise times $T_s$ to $T_1$, $T_2$ to $T_3$ . . . $T_{n-1}$ to $T_n$, where $T_s$ is a start time, wherein said second set of time intervals comprise times $T_1$ to $T_2$, $T_3$ to $T_4$ . . . $T_n$ to T, and wherein n is an odd integer greater than 3.

20. A sampled-data control system for generating a generalized filter function comprising:

a pulse filter comprising a control loop, said control loop including a means for calculating an error signal representing a difference between an output response of said filter and an input signal coupled to said filter; a sample and hold means for periodically sampling said difference signal at discrete points in time, said sampled signal being held at a sampled value during a first set of time intervals and changed to a reference level during a second set of time intervals, said first and second time intervals being alternated within a sampling period T; a means for selectively switching the polarity of said alternately held/changed signal; and a variable gain means for amplifying said alternately held/changed signal;

memory/computation device means coupled in parallel to said pulse filter for extending said output response of said pulse filter beyond said sampling period.

21. The control system of claim 20 wherein said memory/computation device means comprises a microprocessor.

22. A sampled-data control system for generating a generalized filter function comprising:

a pulse filter comprising a control loop means for calculating an error signal representing a difference between an output response of said filter and an input signal coupled to said filter; said control loop means including a sample and hold means for periodically sampling said difference signal at discrete points in time, said sampled signal being held at a sampled value during a first set of time intervals and changed to a reference level during a second set of time intervals, said first and second time intervals being alternated within a sampling period T, wherein a transfer function of said sample and hold means is given in the s-domain by the equation:

$$G(s)=[A_1(\exp^{(-sTs)}-\exp^{(-sT1)})+(A_3(\exp^{(-sT2)}-\exp^{(-sT3)})\ldots +A_n(\exp^{(-sTn-1)}-\exp^{(-sTn)}))]/(sT)$$

where n is an odd integer greater than 3, $A_n$ is a gain term, and Ts is a start time, and where time intervals Ts to T1, T2 to T3 . . . Tn–1 to Tn comprise said first set of intervals, and time intervals T1 to T2, T3 to T4 . . . Tn to T, comprise said second set of intervals;

memory/computation device means coupled in parallel to said pulse filter for extending said output response of said pulse filter beyond said sampling period.

23. The control system of claim 22 wherein said memory/computation device means comprises microprocessor.

* * * * *